(12) United States Patent
Waffenschmidt et al.

(10) Patent No.: US 9,741,487 B2
(45) Date of Patent: Aug. 22, 2017

(54) CONDUCTIVE LAYER OF A LARGE SURFACE FOR DISTRIBUTION OF POWER USING CAPACITIVE POWER TRANSFER

(75) Inventors: Eberhard Waffenschmidt, Aachen (DE); Adrianus Sempel, Waalre (NL); Dave Willem Van Goor, Nederweert eind (NL); Henricus Theodorus Van Der Zanden, Sint-Oedenrode (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 489 days.

(21) Appl. No.: 14/238,276

(22) PCT Filed: Aug. 9, 2012

(86) PCT No.: PCT/IB2012/054057
§ 371 (c)(1),
(2), (4) Date: Feb. 11, 2014

(87) PCT Pub. No.: WO2013/024404
PCT Pub. Date: Feb. 21, 2013

(65) Prior Publication Data
US 2014/0197695 A1    Jul. 17, 2014

Related U.S. Application Data

(60) Provisional application No. 61/671,855, filed on Jul. 16, 2012, provisional application No. 61/523,948,
(Continued)

(51) Int. Cl.
H01F 27/42    (2006.01)
H01F 37/00    (2006.01)
(Continued)

(52) U.S. Cl.
CPC .............. H01F 38/14 (2013.01); H02J 7/025 (2013.01); H04B 5/0012 (2013.01); H04B 5/0037 (2013.01)

(58) Field of Classification Search
CPC ........ H01F 38/14; H02J 7/025; H04B 5/0012; H04B 5/0037
(Continued)

(56) References Cited

U.S. PATENT DOCUMENTS

2009/0091403 A1    4/2009 Hemmerlein et al.
2009/0184950 A1    7/2009 Furuta et al.
(Continued)

FOREIGN PATENT DOCUMENTS

CN    1106165 A    8/1995
EP    1793307 A1    6/2007
(Continued)

OTHER PUBLICATIONS

Mitchell Herman Kline; "Capacitive Power Transfer", Electrical Engineering and Computer Sciences Univ. of California At Berkeley, Tecnical Report No. UCB/EECS-2010-155, Dec. 15, 2010, pp. 1-37.
(Continued)

Primary Examiner — Hal Kaplan
(74) Attorney, Agent, or Firm — Akarsh P. Belagodu (57) ABSTRACT

An apparatus (300) for supplying power to a load in a capacitive power transfer system comprises a power generator (350) operating at a first frequency; a transmitter comprising a plurality of first electrodes (310) connected to a first terminal of the power generator (350) and a plurality of second electrodes (320) connected to a second terminal of the power generator (350) of a transmitter portion of the apparatus (300); and a plurality of inductors (340), wherein each inductor of the plurality of inductors is connected
(Continued)

between a pair of a first electrode and a second electrode of the plurality of first and second electrodes, wherein each inductor comprises, together with a parasitic capacitor (330) formed between each pair of the first electrode and the second electrode, a resonant circuit at the first frequency in order to compensate for current loss due to parasitic capacitances.

15 Claims, 11 Drawing Sheets

Related U.S. Application Data filed on Aug. 16, 2011, provisional application No. 61/523,964, filed on Aug. 16, 2011.

(51) Int. Cl.
*H01F 38/14* (2006.01)
*H02J 7/02* (2016.01)
*H04B 5/00* (2006.01)

(58) Field of Classification Search
USPC .......................................................... 307/104
See application file for complete search history.

(56) References Cited

U.S. PATENT DOCUMENTS

2010/0254481 A1  10/2010  Nakagawa
2011/0090030 A1   4/2011  Pagani

FOREIGN PATENT DOCUMENTS

| | | |
|---|---|---|
| JP | H0794928 A | 4/1995 |
| JP | 2010193692 A | 9/2010 |
| WO | 2010150317 A1 | 12/2010 |
| WO | 2010150318 A1 | 12/2010 |

OTHER PUBLICATIONS

Arka Majumdar et al; "Alignment and Performance Considerations for Capacitive, Inductive, and Optical Proximity Communication", IEEE Transactions on Advanced Packaging, vol. 33, No. 3, Aug. 2010, pp. 690-701.

CONDUCTIVE LAYER OF A LARGE SURFACE FOR DISTRIBUTION OF POWER USING CAPACITIVE POWER TRANSFER

This application claims the benefit of U.S. provisional patent application No. 61/523,948 and U.S. provisional application No. 61/523,964, both filed on Aug. 16, 2011, and U.S. provisional application No. 61/671,855, filed Jul. 16, 2012.

The invention generally relates to capacitive power transfer and, more particularly, to parasitic capacitance when using large surfaces for power distribution using capacitive power transfer.

A wireless power transfer refers to supplying electrical power without any wires or contacts, whereby the powering of electronic devices is performed through a wireless medium. One popular application for contactless powering is for charging portable electronic devices, e.g., mobile phones, laptop computers, and the like.

One implementation of wireless power transfers is by an inductive powering system. In such a system, the electromagnetic inductance between a power source (transmitter) and the device (receiver) allows for contactless power transfers. Both the transmitter and receiver are fitted with electrical coils, and when brought into physical proximity, an electrical signal flows from the transmitter to the receiver by a generated magnetic field.

In inductive powering systems, the generated magnetic field is concentrated within the coils. As a result, the power transfer to the receiver pick-up field is very concentrated in space. This phenomenon creates hot-spots in the system which limits the efficiency of the system. To improve the efficiency of the power transfer, a high quality factor for each coil is needed. To this end, the coil should be characterized with an optimal ratio of an inductance to resistance, be composed of materials with low resistance, and be fabricated using a litz wire process to reduce skin-effect. Moreover, the coils should be designed to meet complicated geometries to avoid Eddy-currents. Therefore, expensive coils are required for efficient inductive powering systems. A design for a contactless power transfer system for large areas would necessitate many expensive coils, and thus for such applications an inductive powering system may not be feasible.

Capacitive coupling is another technique for transferring power wirelessly. This technique is predominantly utilized in data transfer and sensing applications. A car-radio antenna glued on the window with a pick-up element inside the car is an example of a capacitive coupling. The capacitive coupling technique is also utilized for contactless charging of electronic devices. For such applications, the charging unit (implementing the capacitive coupling) operates at frequencies outside the inherent resonance frequency of the device. In the related art, a capacitive power transfer circuit that enables LED lighting is also discussed. The circuit is based on an inductor in the power source (driver). As such, only a single receiver can be used and the transmitter frequency should be tuned to transfer the maximum power. In addition, such a circuit requires pixelated electrodes which ensure power transfer between the receiver and transmitter when they are not perfectly aligned. However, increasing the number of the pixelated electrodes increases the number of connections to the electrodes, thereby increasing the power losses. Thus, when having only a single receiver and limited size electrodes, the capacitive power transfer circuits discussed in the related art cannot supply power over a large area, e.g., windows, walls, and so on. In addition, providing power over large surface areas poses several challenges. For example, a typical user would desire power from any arbitrary position over a large surface area. Moreover, when large surface areas are used for capacitive power transfer there are various parasitic capacitances that impact the performance of the system.

Therefore, it would be advantageous to provide a low cost and feasible capacitive power transfer system for wireless power applications over large surface areas, while reducing the impact of parasitic capacitance appearing in such a capacitive power transfer system.

Certain embodiments disclosed herein include an apparatus for supplying power to a load of a capacitive power transfer system. The apparatus comprises a power generator operating at a first frequency; a transmitter comprising a plurality of first electrodes connected to a first terminal of the power generator and a plurality of second electrodes connected to a second terminal of the power generator of a transmitter portion of the apparatus; and a plurality of inductors, wherein each inductor of the plurality of inductors is connected between a pair of a first electrode and a second electrode of the plurality of first and second electrodes, wherein each inductor comprises together with a parasitic capacitor formed between each pair of the first electrode and the second electrode a resonant circuit at the first frequency in order to compensate for current loss due to parasitic capacitances.

Certain embodiments disclosed herein also include a circuit for reducing common mode (CM) currents in a capacitive power transfer system. The circuit comprises a first terminal connected to a first transmitter electrode of the capacitive power transfer system, wherein the first transmitter electrode forms a first parasitic capacitor to a protected earth connected to an earth ground; a second terminal connected to a second transmitter electrode of the capacitive power transfer system, wherein the second transmitter electrode forms a second parasitic capacitor to the PE; and wherein the circuit generates a first periodic voltage signal between the first terminal and the earth ground, the circuit further generates a second periodic voltage signal between the second terminal and the earth ground, wherein at least an amplitude of each of the first periodic voltage signal and the second periodic voltage signal is controlled to essentially offset the common mode (CM) current flowing through the first parasitic capacitor and the second parasitic capacitor.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

It is important to note that the embodiments disclosed herein are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 1:
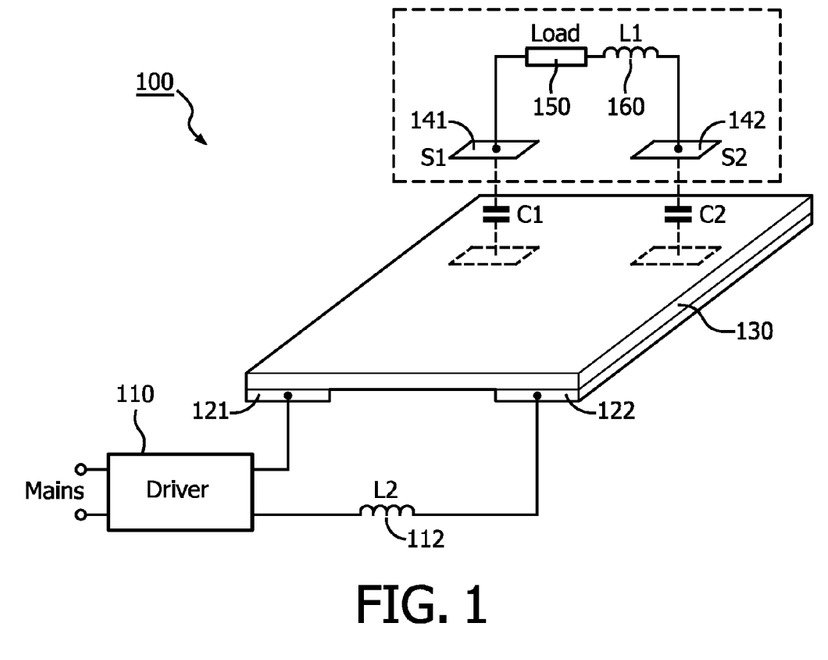
FIG. 1 shows a capacitive power transfer system according to an embodiment.

FIG. 1 shows an exemplary and non-limiting schematic diagram of a capacitive power system 100 utilized to describe various embodiments disclosed herein. The system 100 enables power transmissions over large areas. The system 100 can be installed in places where open electrical contacts are not preferred or are not desirable, such as bathrooms, retail-shops where regular variations are needed to illuminate a product(s), furniture, and the like. The system 100 can transfer power over a large area, such that the system 100 can be utilized to power devices mounted on walls, windows, mirrors, floors, seats, aisles, and so on.

The system 100 includes a driver 110 connected to a pair of transmitter electrodes 121 and 122 which are attached to an insulating layer 130. The system 100 also includes a pair of receiver electrodes 141 and 142 connected to a load 150 and an inductor 160. Optionally, the system 100 may include an inductor 112 coupled to the driver 110. The connection between the transmitter electrodes 121,122 to the driver 110 is by means of a galvanic contact or a capacitive in-coupling.

A power signal is supplied to the load 150 by placing the receiver electrodes 141, 142 in proximity to the transmitter electrodes 121, 122 without having a direct contact between the two. Thus, neither a mechanical connector nor any electrical contact is required in order to power the load 150. The load 150 may be, but is not limited to, lighting elements (e.g., LED, LED string, a lamp, etc.), organic light emitting diode (OLED) surfaces, displays, computers, power chargers, loudspeakers, and the like.

The driver 110 outputs an AC voltage signal having a frequency that substantially matches the series-resonance frequency of a circuit consisting of a series of the capacitors and inductors 112, 160. The capacitors—shown in dotted lines in FIG. 1 and labeled as C1 and C2—are the capacitive impedance of the transmitter electrodes 121, 122 and receiver electrodes 141,142. The impedances of the capacitors C1, C2 and inductor 160, and optionally inductor 112, cancel each other at the resonance frequency, resulting in a low-ohmic circuit. Thus, the system 100 is capable of delivering power to the load 150 with very low power losses.

Figure 2:
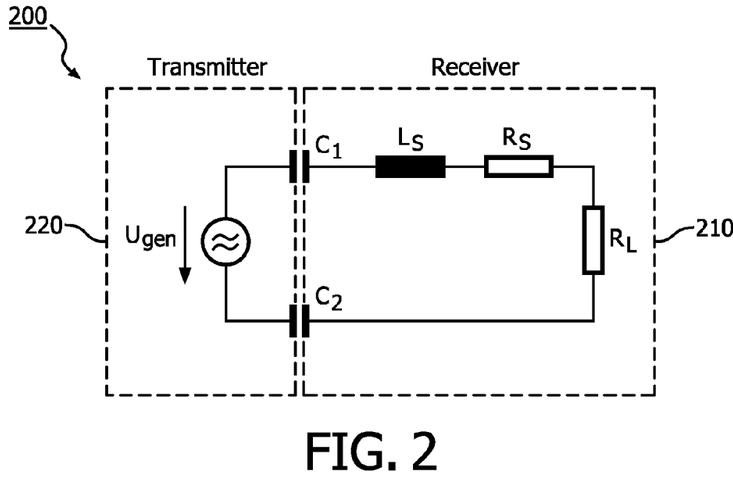
FIG. 2 shows an electric diagram of the capacitive power transfer system implemented according to an embodiment.

An electric diagram 200 of the system 100 is provided in FIG. 2, showing transmitter 220 and receiver 210. The maximum power is obtained when the frequency of the power signal Ugen is close to the series-resonance of the circuit comprised of the load RL, the resistor RS (representing the inductor resistance) capacitors C1 and C2, and inductor LS. The series-resonance is determined by the values of the capacitors C1, C2 and inductor LS. The values of the capacitors C1, C2 and inductor LS are selected such that they cancel each other at the operating frequency of the signal Ugen. Therefore, only the series resistance of the inductor RS and the connectivity of the electrodes limit the power transfer. It should be appreciated that this allows transferring AC signals characterized by high power with low frequency signals.

Referring back to FIG. 1, the driver 110 generates an AC signal of which amplitude, frequency, and waveform can be controlled. The output signal typically has an amplitude of tens of volts and a frequency of up to a few Mega Hertz (MHz). Frequency tuning between the generated signal and the series-resonance is performed by changing the frequency, phase, or duty cycle of the signal output by the driver 110. Alternatively, the frequency tuning is achieved by changing the capacitance or inductive values of the circuit connected to the driver 110.

The insulating layer 130 is a thin layer substrate material that can be of any insulating material, including for example, air, paper, wood, textile, glass, DI-water, and so on. Preferably, a material with dielectric permittivity is selected. The thickness of the insulating layer 130 is typically between 10 microns (e.g., a paint layer) and a few millimeters (e.g., a glass layer).

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. In another embodiment, the transmitter electrodes 121, 122 can be placed on opposite sides of the insulating layer 130. The transmitter electrodes 121, 122 can be any shape including, for example, a rectangle, a circle, a square, or combinations thereof. The conductive material of each transmitter electrode may be, for example, carbon, aluminum, indium tin oxide (ITO), organic material, such as Poly(3,4-ethylenedioxythiophene (PEDOT), copper, silver, conducting paint, or any conductive material.

The receiver electrodes 141, 142 can be of the same conductive material as the transmitter electrodes 121, 122 or made of different conductive material. The total capacitance of the system 100 is formed by the overlapping areas of respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This element may be in a form of one or more inductors that are part of the transmitter electrodes or the receiver electrodes, distributed over the driver 110 and the load (e.g., inductors 160 and 112 shown in FIG. 1), inductors incorporated within insulating layer 130, or any combination thereof In an embodiment, an inductor utilized in the system 100 can be in a form of a lumped coil.

The load 150 allows for an AC bi-directional current flow. In an embodiment, the load 150 may include a diode or an AC/DC converter to locally generate a DC voltage. The load 150 may further include electronics for controlling or programming various functions of the load 150 based on a control signal generated by the driver 110. To this end, in an embodiment, the driver 110 generates a control signal that is modulated on the AC power signal. For example, if the load 150 is a LED lamp, a control signal output by the driver 110 may be utilized for dimming or color setting of the LED lamp.

The capacitive power system 100, as exemplary illustrated in FIG. 1, depicts a single load 150 that is powered by the driver 110. However, it should be noted that the driver 110 can also power multiple loads, each of which may be tuned to a different operational frequency. Alternatively, the multiple loads may be tuned to the same operational frequency.

Figure 3:
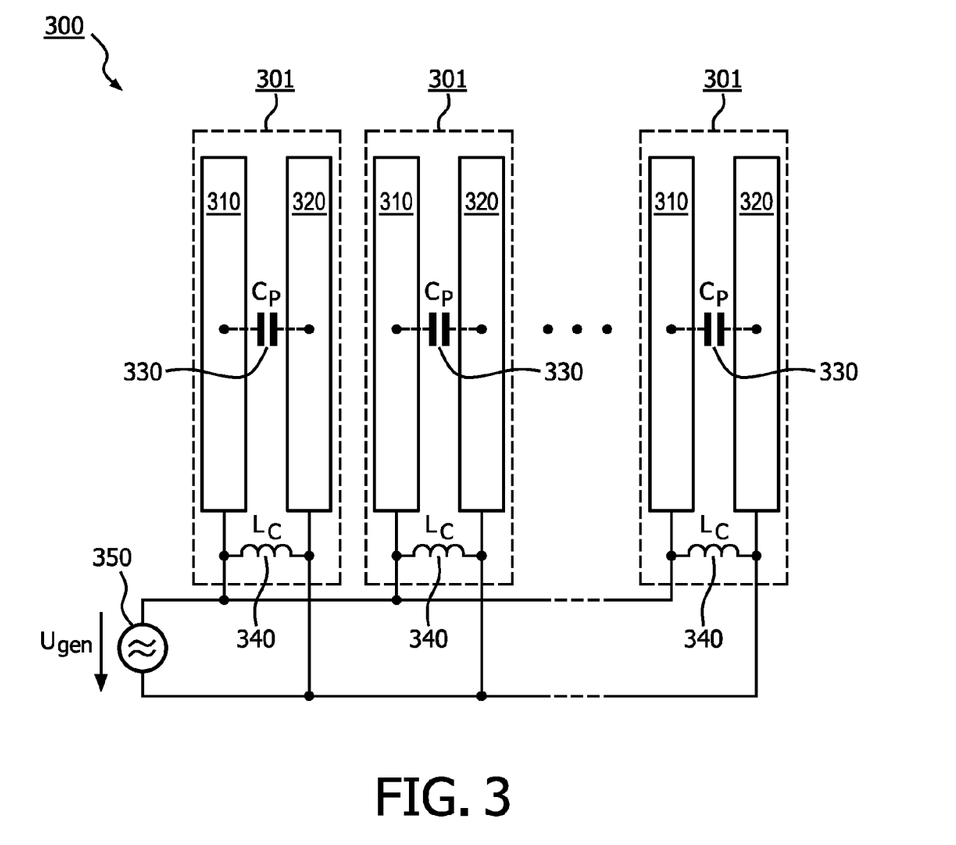
FIG. 3 shows a schematic diagram of a capacitive power transmission grid with parasitic capacity compensation, without a load.

FIG. 3 depicts an exemplary and non-limiting schematic diagram of a capacitive power transmission grid 300 with parasitic capacitance compensation without a load. The construction of such exemplary and non-limiting embodiments of capacitive power transmission grids is discussed with respect to FIGS. 8 through 10 herein below. In FIG. 3 the transmitter portion is illustrated as comprising a power generator 350 and a plurality of transmitter electrodes 310, 320 that form the transmitter-side plates of the capacitors $C_1$ and $C_2$, respectively, as shown in FIG. 2. However, when the transmitter electrodes 310 and 320 are large, then parasitic capacitance Cp 330 appears between the transmitter electrodes 310 and 320. The transmitter electrodes 310 and 320 are part of transmitter modules 301. This parasitic capacitance Cp 330 impacts the performance of the capacitive power transfer system. To compensate for the parasitic capacitance Cp 330, an inductor Lc 340 is connected in parallel to the transmitter electrodes 310 and 320. The value for the inductor Lc 340 is selected such that it forms a parallel resonant circuit with the parasitic capacitance Cp 330, which is in resonance at the operating frequency of the power generator 350. As a result, the current through the inductor 340 cancels out the capacitive current of the parasitic capacitance Cp 330, such that the current is negligible outside the transmitter module.

According to one embodiment, each transmitter module 301 comprises, for example, two electrodes 310 and 320 and a compensating inductor 340, whereby the compensated transmitter module 301 does not cause additional loading on the generator 350. A person of ordinary skill in the art readily appreciates that this embodiment reduces the idle current that would otherwise be present in these kinds of capacitive power transfer systems. In a further embodiment the compensating inductor Lc 340 may be a variable inductor that can be adjusted to a necessary value to compensate for a specific and unpredictable parasitic capacitance Cp 330.

Figure 4:
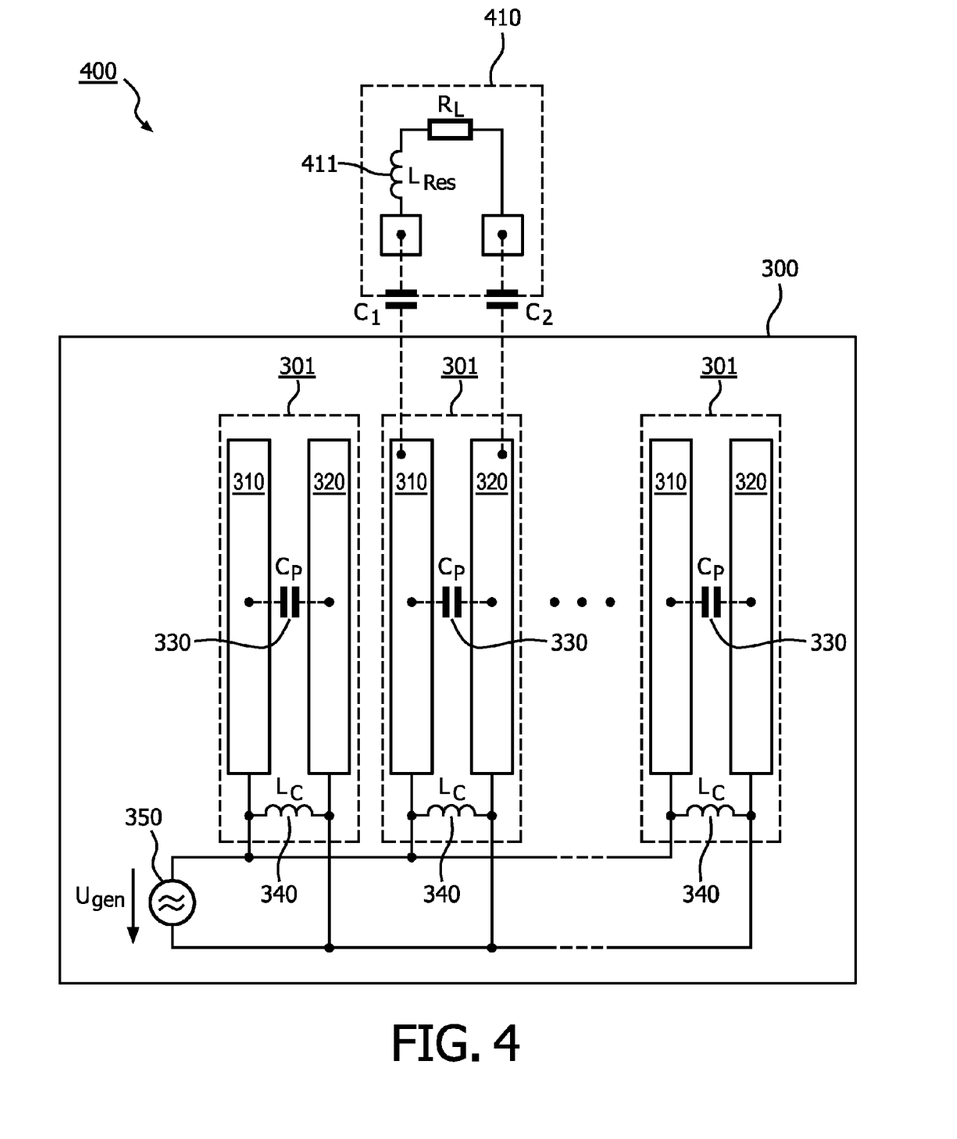
FIG. 4 shows a schematic diagram of a capacitive power transmission grid with parasitic capacity compensation, with a load.

FIG. 4 shows an exemplary and non-limiting schematic diagram 400 of a capacitive power transmission grid with parasitic capacitance compensation and a load. A receiver module 410 is capacitively coupled to the two electrodes (a transmitter module 301 of FIG. 3) of the capacitive power transfer grid 300, as represented by the coupling capacitors $C_1$ and $C_2$. Preferably, the receiver 410 comprises a matching inductor (Lres) 411 that forms a series resonant circuit together with the coupling capacitors $C_1$ and $C_2$, which is in resonance at an operating frequency of the power generator 350 of the capacitive power transfer grid 300. As noted above, in one embodiment the compensation inductors Lc 340 advantageously reduce idle currents of the power generator.

A capacitive power transfer system may also experience adverse effects resulting from common mode (CM) currents induced between the alternating current (AC) potential of the electrodes of the transmitter portion and ground, due to the parasitic capacitances of the transmitter electrodes to ground (as opposed to the parasitic capacitance between transmitter electrodes discussed in detail hereinabove). While the below discussion details the parasitic capacitances of the transmitter electrodes to ground, the discussion is also applicable for parasitic capacitances of the receiver electrodes to ground.

Figure 5:
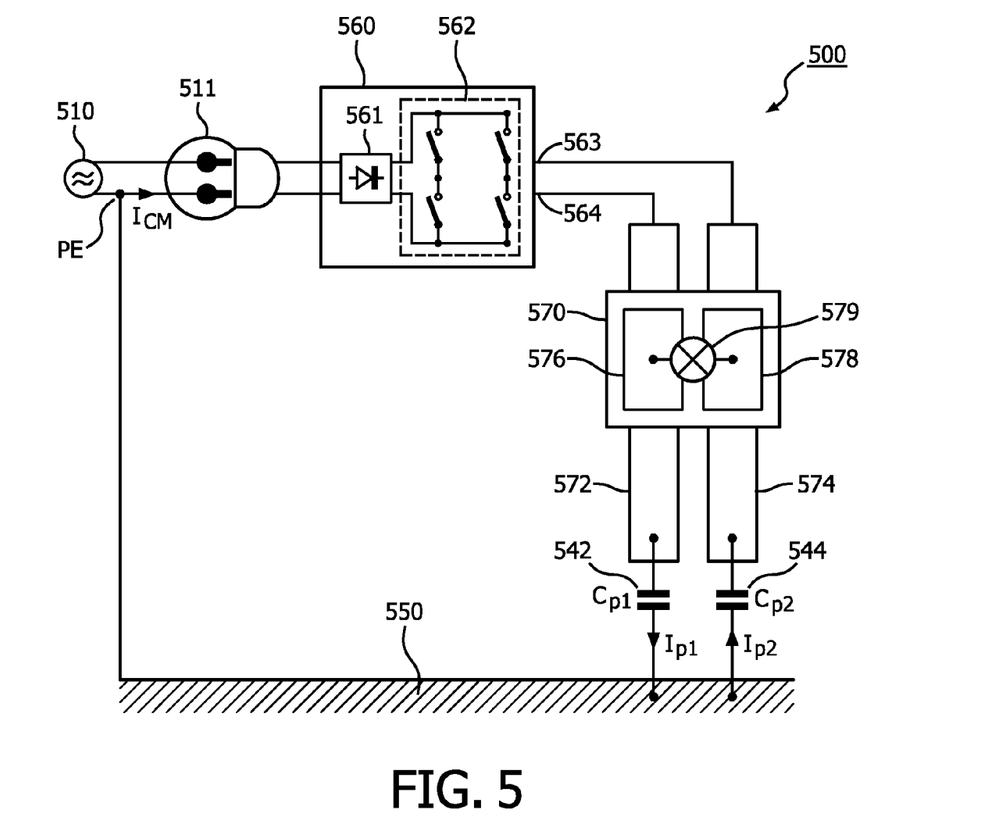
FIG. 5 is a schematic diagram of a capacitive power transfer system equipped with a current compensation circuit designed to eliminate common mode current paths according to one embodiment.

FIG. 5 shows an exemplary and non-limiting diagram of a capacitive power transfer system 500 equipped with a current compensation circuit 560 designed to eliminate CM current paths. Also illustrated in FIG. 5 are parasitic capacitances 542 and 544 of the transmitter electrodes to ground from a physical perspective.

A power supply 510 is connected to a current compensation circuit 560, that together provide an opposite alternating voltage signal to transmitter electrodes 572 and 574. A pair of receiver electrodes 576 and 578, of receiver 570, is connected to a load 579, which is powered by the transmitter electrodes 572, 574 by means of the capacitive coupling as discussed above. Thus, between the transmitter electrodes 572, 574 and receiver electrodes 576, 578 a pair of capacitors (not shown in FIG. 5 is formed.

Between each of the transmitter electrodes 572, 574 and earth ground 550 there exists parasitic capacitors 542 and 544. Such parasitic capacitance may occur from iron material in a concrete wall or ceiling, or could be the result of a conducting floor, or the like, forming a parasitic capacitance between two effective conductive plates that have a dielectric material therebetween.

Typically, the distance and the nature of the dielectric to ground is unpredictable, and hence so too is the specific capacitive value. Furthermore, the parasitic capacitances may be different for each of the transmitter electrodes, i.e., if one transmitter electrode is situated directly above an enforcement iron rod in a wall and another transmitter electrode is not. In addition, the shape of the transmitter electrodes may be different, which also may lead to asymmetric parasitic capacitances.

If an alternating voltage against earth ground 550 is applied to the transmitter electrodes 572 and 574, currents flow through the parasitic capacitors 542 and 544 as indicated in FIG. 5 and denoted by $I_{p1}$ and $I_{p2}$, respectively. These currents flow along the earth ground 550 and then back as common mode (CM) currents ($k_{CM}$) through, for example, a mains plug 511 of the power supply 510 back to the earth ground 550. As a non-limiting example, the mains plug 511 may be a plug to a wall outlet to power supply 510. However, the CM currents may be a cause of malfunction, especially if the current in the connection cable is unwanted, and therefore must be limited according to electromagnetic interference (EMI) standards. Usually, bulky and expensive CM filters with large inductors are applied to block the path for CM currents. However, it is difficult to match the filter components and a resulting filter is big in size, prone to losses, and expensive.

According to various embodiments disclosed herein, the CM currents are reduced and essentially offset by means of the current compensation circuit 560 as discussed herein below. The CM currents are offset to a minimal value, i.e., a value that an additional reduction of the CM currents cannot achieve, or is otherwise negligible. The current compensation circuit 560 includes two terminals (564 and 563) that are connected to the transmitter electrodes 572 and 574 respectively. To minimize the CM currents, the electrodes 572 and 574 are driven with a voltage asymmetrically to ground, such that the CM currents of the positive electrode (e.g., electrode 572) and the negative electrode (e.g., electrode 574) essentially cancel each other, i.e., until a common mode current flowing through the two electrodes is minimal, or otherwise negligible. With this aim, the AC voltage against the earth potential of one of the terminals (564) is reduced. This also reduces the related parasitic current $I_{P1}$. The opposite voltage at the terminal (563) is increased such that the parasitic current $I_{P2}$ has the same amplitude as $I_{P1}$, whereby both currents compensate each other. The common mode current $I_{CM}$ is the sum of both parasitic currents $I_{P1}$ and $I_{P2}$. It should be noted the voltage difference between the two terminals 563, 564 remains the same for both operation modes, thus the power transferred to the receiver electrodes is not affected by the balancing of the common mode currents.

Figure 12A:
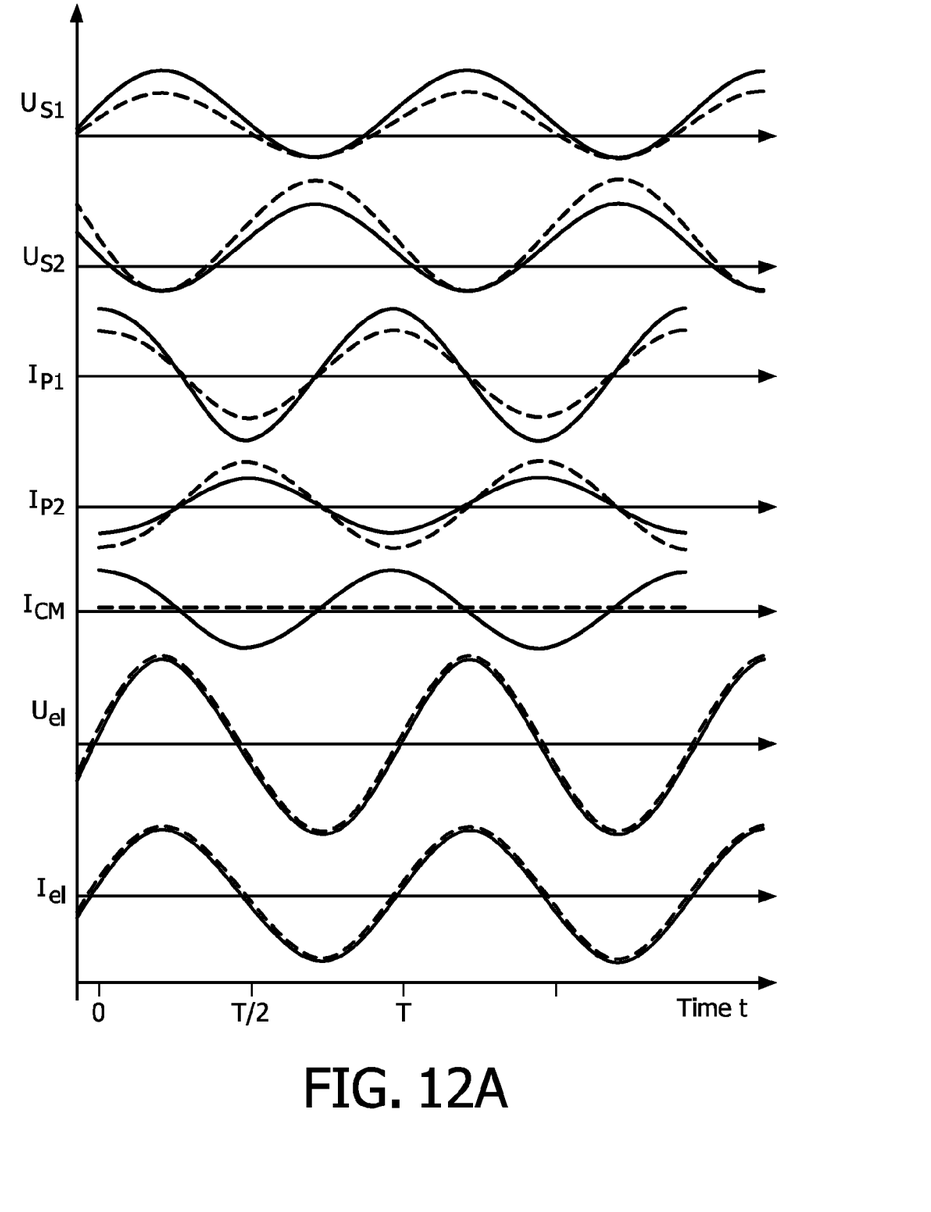
FIGS. 12A, 12B, and 12C depict the operation of the current compensation circuit according to various embodiments.

The operation for common mode current compensation is further illustrated in FIG. 12A. In the example shown in FIG. 12A, the power supply generates sinusoidal voltage signals. The signals shown in FIG. 12A are as follows:

$U_{S1}$ represents the voltage signal between the first generator terminal 564 and the earth ground 550. The amplitude of this voltage signal (peak-to-peak) determines the amplitude of the first parasitic current $I_{P1}$. A DC offset is canceled by the parasitic capacitor.

$U_{S2}$ represents the voltage signal between the second generator terminal 563 and earth ground 550. The amplitude of this voltage signal (peak-to-peak) determines the amplitude of the second parasitic current $I_{P2}$. A DC offset is canceled by the parasitic capacitor.

$I_{P1}$ represents the parasitic current through the capacitor $C_{P1}$ (542) formed by the first electrode (572) to the earth ground 550. Due to the capacitor $C_{P1}$ (542), there is a phase shift to the voltage $U_{S1}$.

$I_{P2}$ represents the parasitic current through the capacitor $C_{P2}$ (544) formed by the second electrode 574 to earth ground 550.

$I_{CM}$ represents the sum of both parasitic currents $I_{P1}$ and $I_{P2}$, which is the resulting common mode current, and which is to be compensated.

$U_{el}$ represents the voltage between the first terminal 564 and the second terminal 563. It is the difference of the voltages $U_{S1}$ and $U_{S2}$. The amplitude of $U_{el}$ determines the amount of power that can be transmitted in the capacitive power transmission system.

$I_{el}$ represents the current through the transmitter electrodes (572, 574) and the receiver electrodes (576, 578). The $I_{el}$ current depends on the voltage $U_{el}$ and the load 579 resistance.

The solid lines represent operation of a circuit according to the state of the art (i.e., excluding the effect of the compensation circuit 560). As an example, the parasitic currents $I_{P1}$ and $I_{P2}$ are assumed to be different in this operation mode because of asymmetries of the electrodes. The dashed lines represent the operation according to the teachings disclosed herein. The AC voltage against earth potential of one of the terminals ($U_{S1}$) is reduced. This also reduces the related parasitic current $I_{P1}$. The opposite voltage $U_{S2}$ is increased, such that the parasitic current $I_{P2}$ has the same amplitude as $I_{P1}$, so that both currents compensate each other. As the graph representing the signal $U_{el}$ shows, the voltage difference between the two terminals (563, 564) remains the same for both operation modes. Therefore, the power transmission is not affected by the balancing of the common mode currents.

Figure 11:
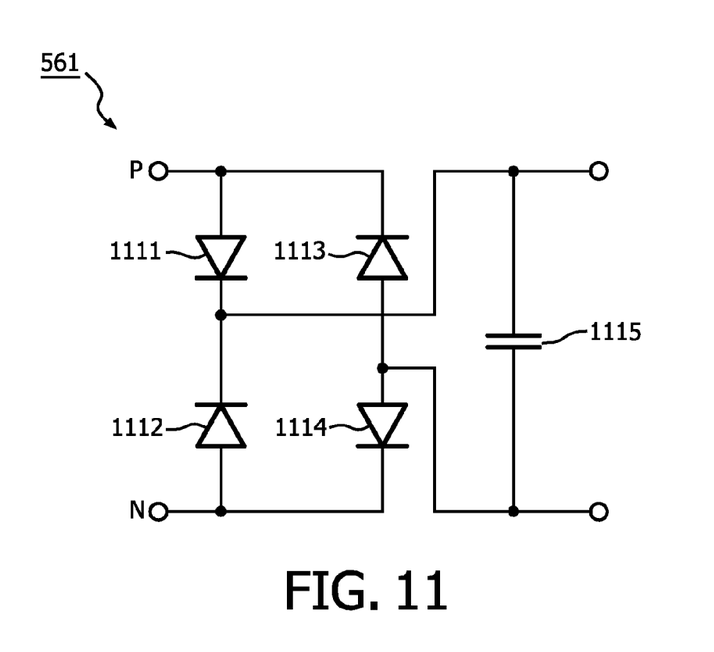
FIG. 11 is a schematic drawing of a rectifier used in the power transfer system of FIG. 5

In one embodiment, the current compensation circuit 560 includes a rectifier 561, the details of which are shown in FIG. 11, and a switching bridge 562 consisting of four switches. By means of the current compensation circuit 560 the transmitter electrodes 572, 574 are driven with a voltage symmetrically to ground.

Figure 6:
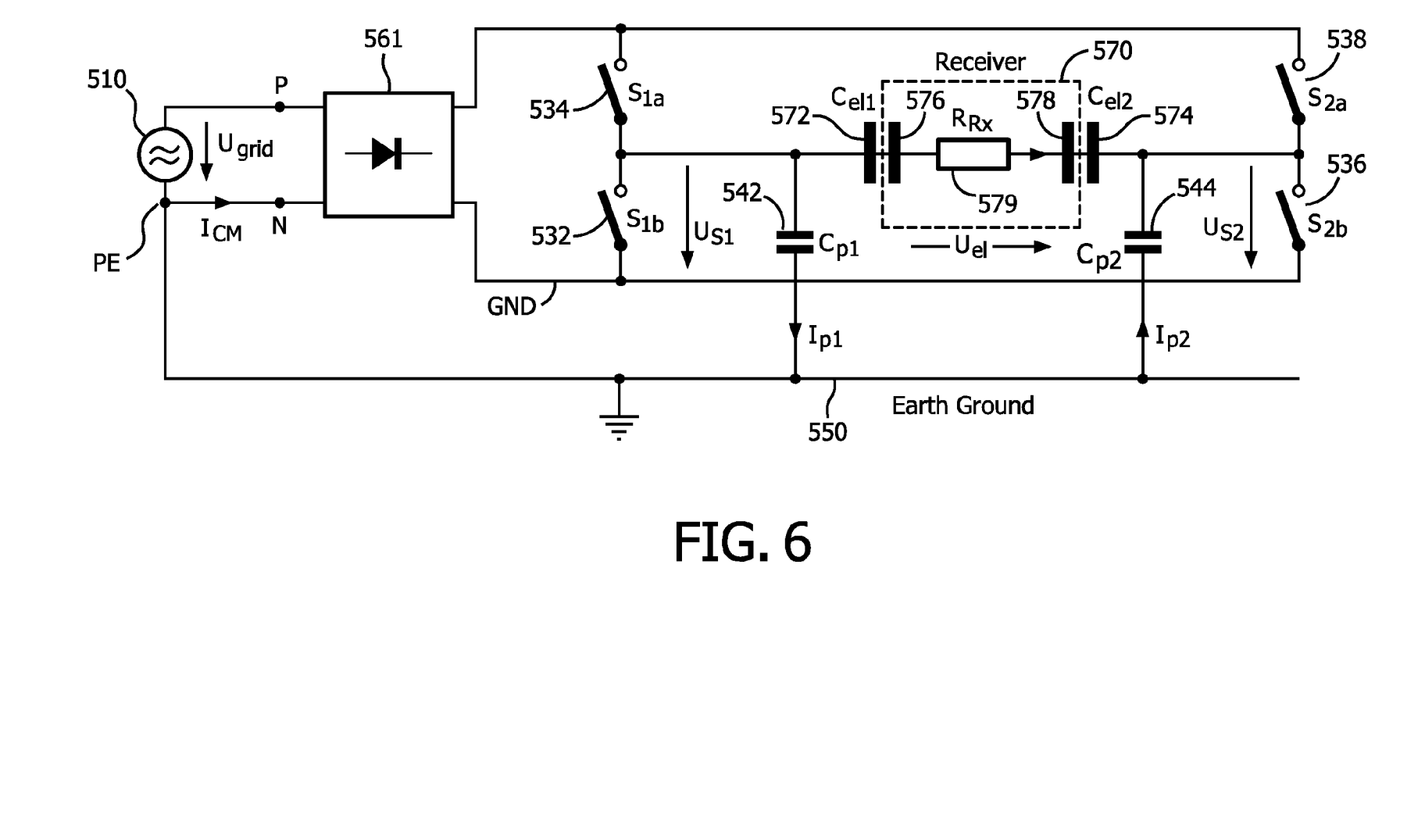
FIG. 6 is an electric diagram of a capacitive power transfer system equipped with the current compensation circuit depicted in FIG. 5.

The operation of the current compensation circuit 560 will be described with reference to FIG. 6, where the switching bridge 562 is shown in FIG. 6 as switches 532, 534, 536, and 538. For ease of description the same numerical references are used in FIGS. 5 and 6.

The power supply 510 is typically connected to a power grid, for example, but without limitation, a main power grid to supply the power to drive the power supply. The power supply 510 has a Phase lead, denoted P, and a neutral lead, denoted N. Usually, the N lead is also connected to protected earth (PE). Via the rectifier 561, the ground potential of the current compensation circuit is connected to the N lead and then also to PE.

The rectifier 561, as further shown in FIG. 11, comprises diodes 1111, 1112, 1113 and 1114, as well as a capacitor 1115 connected at the output. The capacitor 1115 operates such that at low frequencies the leads P and N are free to alternate at the power signal frequency, while at high frequencies, the capacitor 1115 operates as a short-circuit. The high frequency is typically the frequency of the power supply signal.

Referring back to FIG. 6, via the switching bridge, the ground potential of the transmitter electrodes (labeled as GND in FIG. 6) is connected to the N lead and also to the PE. Thus, the earth ground 550 is at the same electrical potential as the transmitter ground GND. As noted above, if an alternating voltage against GND is applied to the transmitter electrodes 572, 574, currents ($I_{p1}$ and $I_{p2}$) flow through the parasitic capacitors (capacitors 542 and 544 in FIG. 5). These currents flow along earth ground and then back as common mode (CM) currents through, for example, the mains plug 511, shown in FIG. 5, back to GND of the transmitter circuit.

Using the current compensation circuit 560, the transmitter ground GND is directly connected (e.g., via the rectifier 561) to the N lead during a positive half-period of the voltage signal. Then, the DC-Supply rectified voltage (Vdc) of the rectifier 561 is connected to the P lead of the power supply. During the negative half-period of the voltage signal, this is reversed and the transmitter ground GND is connected to the P lead, and Vdc is connected to the N lead. The transmitter ground GND and Vdc are connected by the rectifier's capacitor (e.g., capacitor 1115 shown in FIG. 11). For high frequencies (e.g., the frequency of a power generator), this capacitor can effectively be considered a short, such that for high frequencies Vdc and GND are connected together (whereas for low frequencies and DC they are not). Since either Vdc or GND are directly connected to the N lead by a diode, for high frequencies both are always connected to N (but only for high frequencies).

It should be noted that the rectifier 561 may also include a power factor correction circuit (not shown). One of ordinary skill in the art would readily realize that the rectifier 561 is merely used in an exemplary embodiment, and other rectifiers may be used, DC and AC, without departing from the scope of the invention. All such rectifiers have in common, a common mode current that may find a path through the power supply back to a power generator. Therefore, the embodiments disclosed herein provide a solution for this common mode current problem.

In another embodiment, the current compensation circuit 560 may not include the rectifier 561. Such an embodiment can be utilized when a DC voltage, for example, from a DC grid, can be supplied to the circuit 560. It should be noted that even when DC voltage is supplied, CM current can exist.

As noted above, the current compensation circuit provides a solution to reduce CM currents where the electrodes are driven with a voltage symmetrically to ground. If the positive and negative electrodes are equal, their parasitic capacity to ground is also similar. Then, the induced CM currents flowing through the parasitic capacitors of the positive electrodes and the negative electrodes are equal in amplitude but opposite in phase. Thus, they compensate each other and the overall CM current is zero.

The symmetric driving is achieved with a switching bridge 562 formed of switches 532, 534, 536 and 538 as shown in FIG. 6. In an embodiment, the switching bridge 562 may be configured as a full bridge including two pairs of switches. For example, a first pair of switches may include switches 532 and 538, while a second pair of switches may include switches 534 and 536. In one embodiment, each pair of switches may be controlled by the other pair of switches. The pairs of switches are driven such that their output voltage is in opposite phase to each other as shown in exemplary and non-limiting FIG. 7, in which solid lines 710 and 720 correspond to $U_{S1}$ and $U_{S2}$, as shown in FIG. 6.

The output of the first pair of switches comprising switches 532 and 538 is connected to the positive transmitter electrode, and the other output of the second pair of switches including switches 534 and 536 is connected to the negative transmitter electrode.

In most practical cases the parasitic capacitances in the vicinity of the positive and the negative transmitter electrodes (e.g., a wall to which the electrodes 572, 574 are mechanically connected) are slightly different. Thus, if the output voltage of the respective pairs of switches is exactly opposite, the currents through the parasitic capacitors 542 and 544 may not compensate each other as expected, and a remaining CM current may flow. To account for such an asymmetry of the parasitic capacitances, the switching bridge of the current compensation circuit is operated asymmetrically rather than symmetrically.

In one embodiment, the asymmetrical operation of the pair of switches is achieved by causing the duty cycle of the two pairs of switches to be unequal. This is shown in the exemplary and non-limiting FIG. 7, which shows timing diagram 700, including a dashed line output 730 that is slightly larger in duty cycle than the duty cycle of 710 (that in symmetric operation is equal to the duty cycle of 720). The duty cycle of the output voltage affects the amplitude (i.e., voltage with respect to ground) of the fundamental frequency contribution to the pair of switches. By varying the duty cycle, the fundamental frequency amplitude can be adjusted such that the currents through the parasitic capacitors are again equal and compensate each other.

Figure 7:
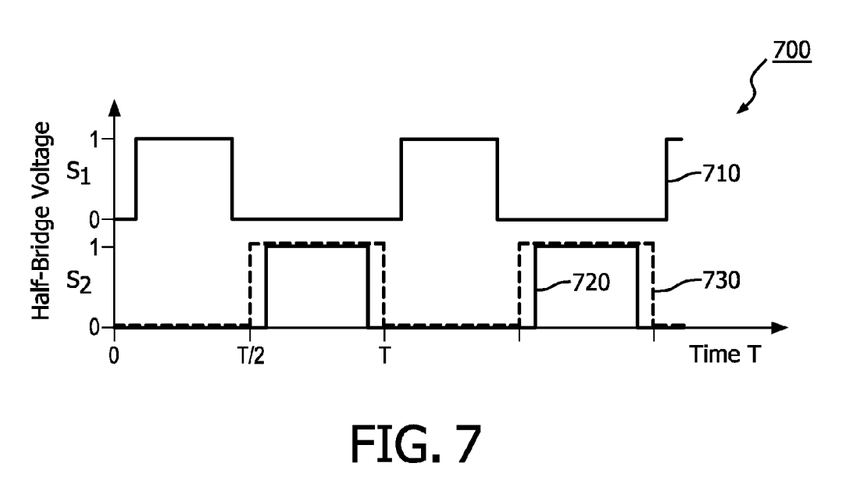
FIG. 7 is a timing diagram for controlling the switches of the current compensation circuit depicted in FIG. 5 according to one embodiment.

In order to avoid a phase shift between the positive and negative parasitic current, the pulses of the first pair of switches and of the second pair of switches appear symmetrically in time. The center of the positive pulse of the first pair of switches match exactly the center of the negative pulse of the second pair of switches (not shown). A common control method for the duty cycle of the full-bridge is a phase shift control between the two pairs of switches running at a 50% duty cycle, where a duty cycle control of each pair of switches is performed.

In another embodiment, the supply voltage for one of the two pairs of switches (or for both) is varied such that the voltage amplitude of the pair of switches is adjusted by varying the supply voltage. This can be done by using a DC-to-DC converter. As a result, the duty cycles of both pairs of switches can remain exactly equal (but opposite) such that higher harmonic contributions of the CM currents may also be compensated.

Figure 12B:
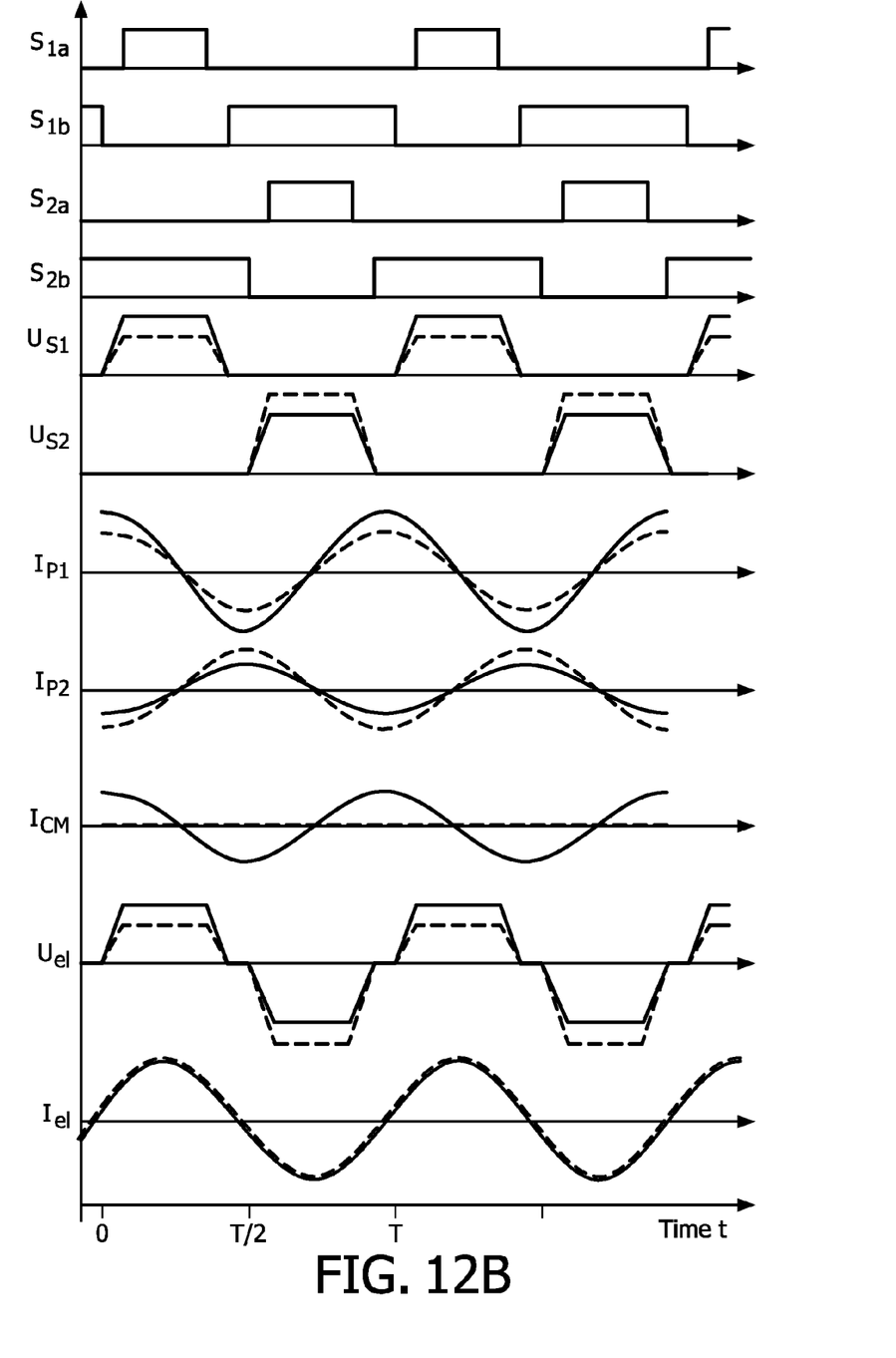
Figure 12C:
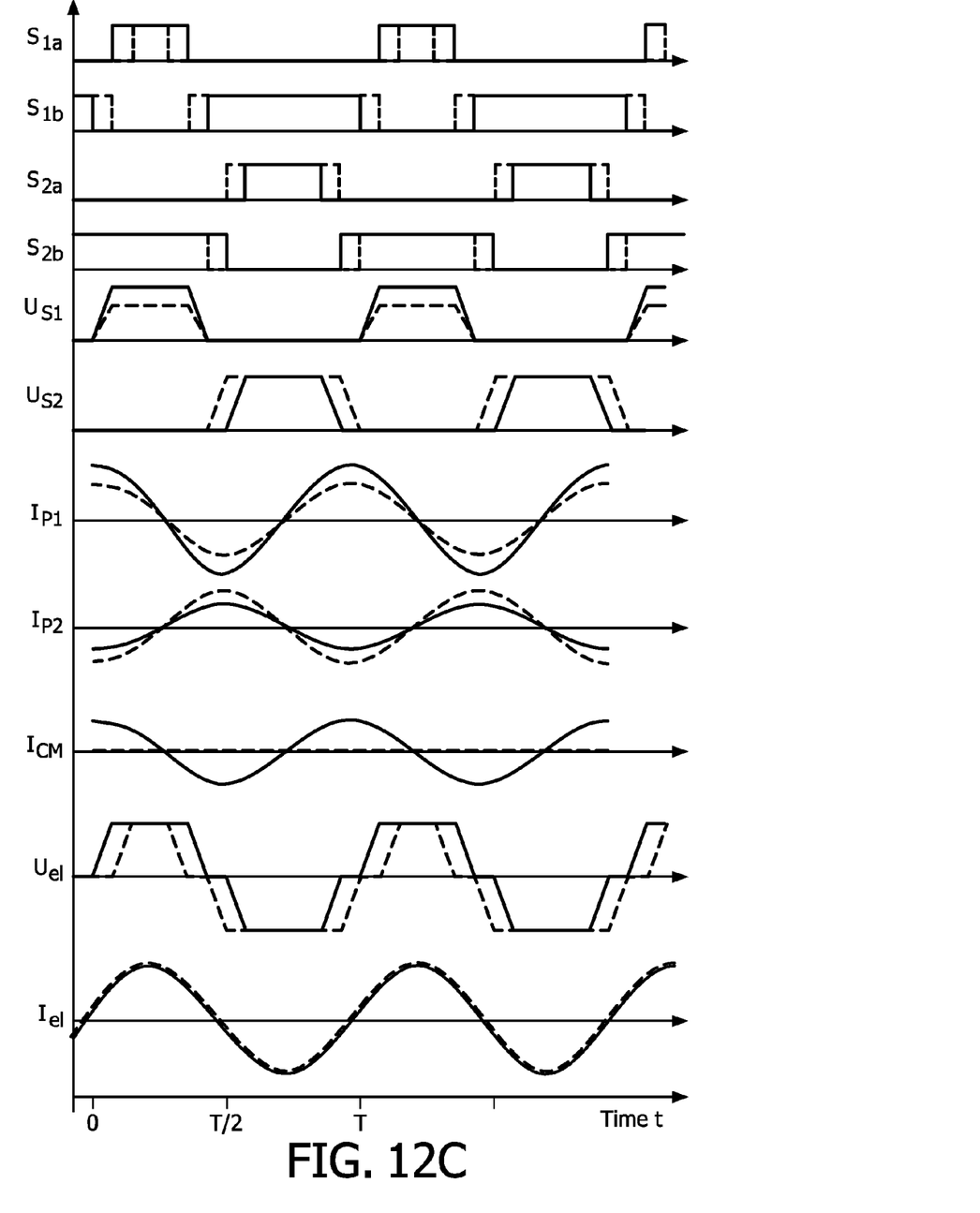

FIGS. 12B and 12C illustrate the operation of the current compensation circuit 560 that includes the switching bridge 562 consisting of four switches in a full-bridge configuration. FIG. 12B depicts the states of the signals $U_{S1}$, $U_{S2}$, $I_{P1}$, $I_{P2}$, $I_{CM}$, $U_{eI}$, $I_{eI}$, each of which discussed above with respect to FIG. 12A. In addition, FIG. 12B shows the states of the switches $S_{1a}$ (534) $S_{1b}$ (532), $S_{2a}$ (538), and $S_{2b}$ (536), in which a high signal indicates a closed switch.

As noted, the voltage signals $U_{S1}$ and $U_{S2}$ at the terminals (564) and (563) have a pulse like shape. The parasitic currents $I_{P1}$ and $I_{P2}$ are represented by their fundamental frequency only, which is sinusoidal and constitutes the most energetic part of the common mode current $I_{CM}$.

The solid lines represent "normal" operation of a full-bridge without performing the CM current compensation. The dashed lines represent the common mode currents compensation according to the embodiments disclosed herein. The $I_{CM}$ is reduced and minimized by changing the amplitude of the power supply, which relates to the amplitudes of the pulses in $U_{S1}$ and $U_{S2}$. As a result, the amplitudes of the respective parasitic currents $I_{P1}$ and $I_{P2}$ are changed, such that their respective amplitudes compensate each other. As depicted by the graph $I_{eI}$, the current $I_{eI}$ flowing through the load is not being affected by the changes in the amplitudes of the parasitic currents. It should be noted that the current $I_{eI}$ is also represented by its fundamental frequency, which is valid, as the receiver is a resonant circuit matched to the operating frequency of the power signal.

FIG. 12C depicts an embodiment current compensation circuit 560 that includes the switching bridge 562 consisting of four switches in a full-bridge configuration where the common mode currents are reduced by changing the pulse widths of the signals $U_{S1}$, $U_{S2}$. The description of signals depicted in FIG. 12C is similar to those illustrated in FIG. 12B.

The solid lines represent "normal" operation of a full-bridge without performing the current compensation. The dashed lines represent the common mode currents compensation according to the embodiments disclosed herein. The $I_{CM}$ is reduced and minimized by modulating the width (thereby, the duty-cycle) of the power supply signal, which relates to the amplitudes of the pulses in $U_{S1}$ and $U_{S2}$. As a result, the amplitudes of the respective parasitic currents $I_{P1}$ and $I_{P2}$ are changed, such that their respective amplitudes compensate each other. Specifically, a wider pulse increases the amplitude of the fundamental frequency of the related parasitic current. Therefore, changing the pulse width can be used to adjust the parasitic currents until these compensate the common mode currents.

Figure 8:
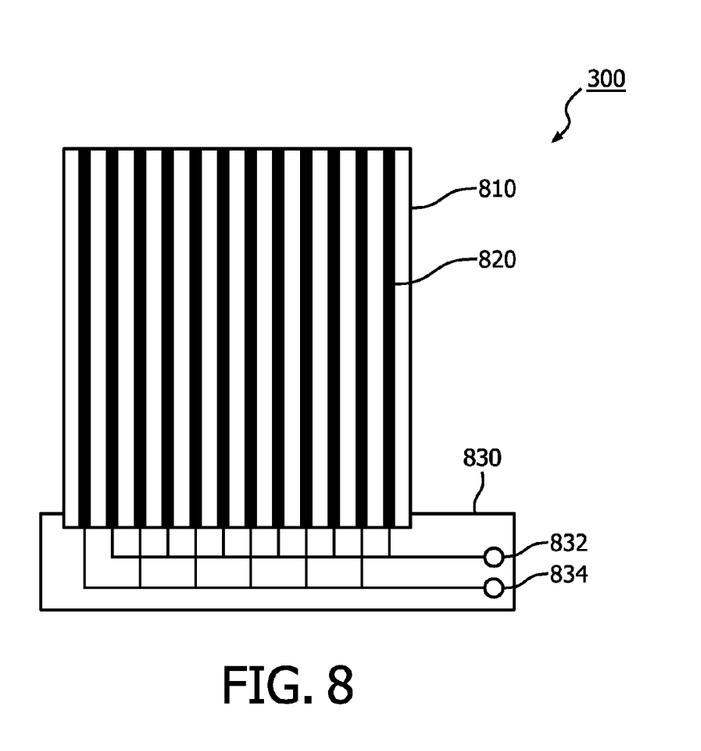
FIG. 8 is a wall covering having a backside covered with vertical conductive stripes with a bottom segment detailing electrical connections thereto.

Several exemplary and non-limiting embodiments of capacitive power transmission grids are discussed herein below. FIG. 8 shows an exemplary and non-limiting wall covering having a backside covered with vertical conductive stripes with a bottom segment having details of electrical connections thereto. As a non-limiting example a wall covering is depicted as wallpaper 810 having a backside covered with vertical conductive stripes 820. The conductive stripes 820 are placed on the back side of the wallpaper material 810 that forms the insulating layer. When the wallpaper 810 is placed on a surface (not shown), for example, a wall, the conductive stripes 820 are between that surface and the wallpaper 810, while the wallpaper material 810 is in fact the insulator layer 130 discussed in greater detail with respect to FIG. 1 hereinabove, where conductive stripes 820 form the transmitter electrodes 122 and 124.

The conductive stripes 820 may be made of, for example, conducting ink, conducting paint, and the like. The stripes can be printed or added to the backside of regular wallpaper, or they may be under an outer surface of the wallpaper 810. The connections to the driver 110 (FIG. 1) are provided by interleaving the connections of the conductive stripes 820. That is, a first conductive stripe 820 is connected in the manner of electrode 121 (FIG. 1) and, therefore, to the supply line 834 of the connection baseboard 830, while the immediately next conductive stripe 820 is connected in the manner of electrode 122 (FIG. 1) and, therefore, to the supply line 832 of the conductive connection 830, and so on and so forth, alternating between the connections. The connections 832 and 834 are part of a connection baseboard 830 designed to be operative with, for example, the wallpaper 810 and accepting the output of driver 110 (FIG. 1).

Figure 9:
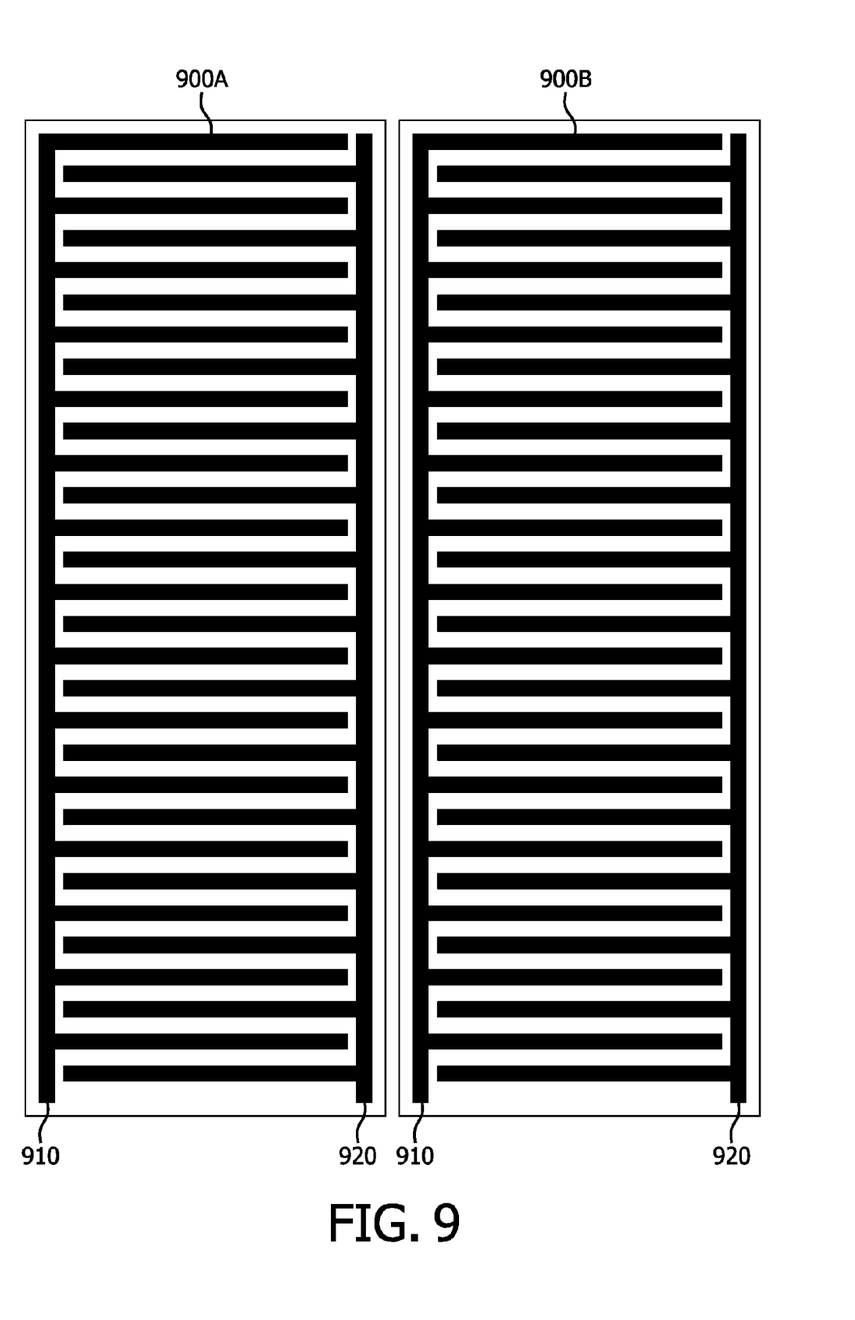
FIG. 9 is a wall covering having a backside covered with horizontal conductive stripes and vertical connecting lines.

FIG. 9 shows an exemplary and non-limiting transmission grid of the capacitive power system. The infrastructure is designed as a wall covering having a backside covered with horizontal conductive stripes and vertical connecting lines. As a non-limiting example a wall covering is depicted as wallpaper 900A and 900B in FIG. 9. Two sheets of such wallpaper 900A and 900B are shown side-by-side. The electrodes 910 and 920 begin with vertical connection lines that are directed horizontally in opposite directions, so that they interleave with each other resulting in a desired pattern allowing a horizontal-based wallpaper solution for capacitive power transfer. The structures shown in FIGS. 8 and 9 are designed to allow for wallpaper that may be cut-to-measure, be connected from the top or the bottom part of the wallpaper, and can optionally share connections between neighboring conducting stripes of neighboring wallpaper sheets. Moreover, the manufactured wallpaper may be rolled into wallpaper rolls in any desired length.

It should be noted that power may be provided to the conducting stripes directly by clamping the wallpaper or protruding pins through the paper layer. However, it is also possible to couple the power to the conducting stripes in a capacitive way. To this end, the transmitter electrodes are positioned on the wallpaper. The power transmission principle for injection of the power to the transmitter electrodes of the wallpaper may be, for example, the same principle as the way the power is transferred from the wallpaper electrodes to the power receiver. The advantage of this configuration is that the position of power injection to the wallpaper can be freely chosen, and no damage is done to the cover layer.

Figure 10:
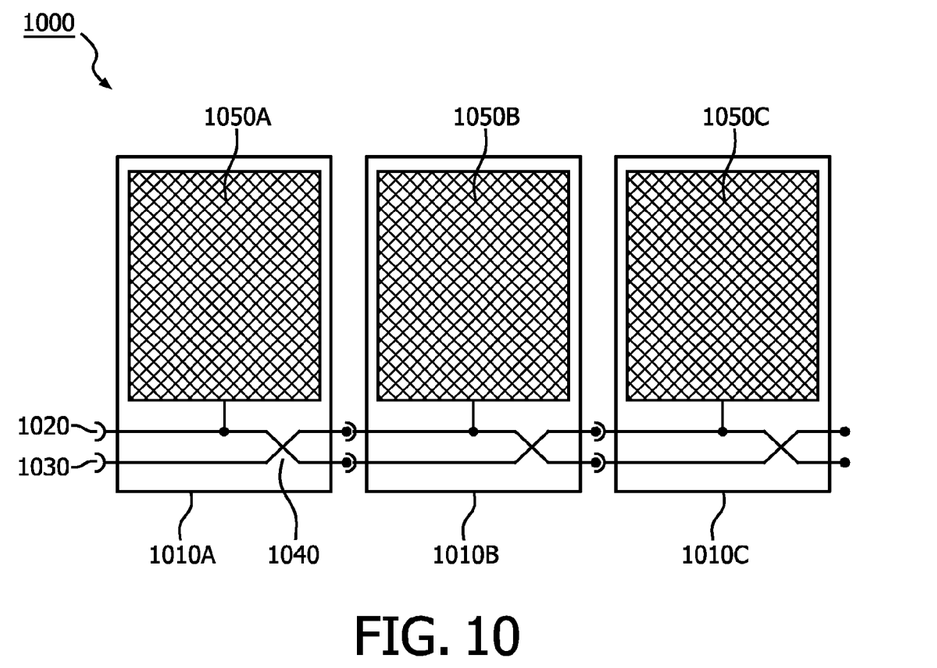
FIG. 10 is a view of an electrical connection of a plurality of segments with integrated connections and connectors.

FIG. 10 shows an exemplary and non-limiting embodiment 1000 of an electric connection of a plurality of segments with integrated connections and connectors. A plurality of segments 1010A, 1010B, and 1010C have integrated connection lines 1020 and 1030 that crossover at point 1040 without having an electrical connection at the intersection point 1040. The connection lines 1020 and 1030 provide the power supply connectivity to the segments. The wire 1020 is electrically connected to the center segment 1050A. When two segments are mounted adjacent to each other, their corresponding center segments are connected to different electrical connection lines.

For example, in FIG. 10, the center segment 1050B of 1010B is connected in fact to a different connection line (i.e., connection line 1030) than the center segments 1050A and 1050C (i.e., connection line 1020). As a result, the segments alternate in polarity, thereby providing the different electrodes as discussed in more detail with respect of FIG. 1 hereinabove. It should, therefore, be understood that the center segment 1050A operates, for example, as electrode 121 shown in FIG. 1, while center segment 1050B operates as electrode 122 shown in FIG. 1.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. An apparatus for supplying power to a load in a capacitive power transfer system configured wirelessly to distribute power over a surface, comprising:
   a power generator operating at a first frequency;
   a transmitter comprising a plurality of first electrodes connected to a first terminal of the power generator and a plurality of second electrodes connected to a second terminal of the power generator of a transmitter portion of the capacitive power transfer system, wherein the plurality of first electrodes and the plurality of second electrodes are mounted on the surface; and
   a plurality of inductors, wherein each inductor of the plurality of inductors is connected in parallel between a pair of a first electrode and a second electrode of the plurality of first and second electrodes, wherein each inductor comprises, together with a parasitic capacitor formed between each pair of the first electrode and the second electrode, a resonant circuit at the first frequency in order to compensate for current loss due to parasitic capacitances.

2. The apparatus of claim 1, wherein each inductor of the plurality of inductors is a variable inductor.

3. A method for reducing idle currents in a transmitter for supplying a power to a load connected in a capacitive power transfer system configured to distribute power over a surface, comprising:
   operating a power generator at a first frequency, said power generator having a first terminal and a second terminal;
   connecting a first electrode of a transmitter portion of the capacitive power transfer system to the first terminal of the power generator;
   connecting a second electrode of the transmitter portion of the capacitive power transfer system to the second terminal of the power generator; and
   connecting an inductor in parallel between the first electrode and the second electrode, the inductor having an inductance to create a resonant circuit with a parasitic capacitor formed between the first electrode and the second electrode, such that the resonant circuit resonates at the first frequency.

4. The method of claim 3, wherein the inductor is a variable inductor.

5. The method of claim 4, further comprising:
   adjusting variable inductance of the variable inductor to cause the resonant circuit to resonate at the first frequency.

6. A circuit for reducing common mode (CM) currents in a capacitive power transfer system configured to wirelessly distribute power over a surface, comprising:
- a first terminal connected to a first transmitter electrode of the capacitive power transfer system, wherein the first transmitter electrode forms a first parasitic capacitor to a protected earth connected to an earth ground; and
- a second terminal connected to a second transmitter electrode of the capacitive power transfer system, wherein the second transmitter electrode forms a second parasitic capacitor to the protected earth;
- wherein the circuit generates a first periodic voltage signal between the first terminal and the earth ground, the circuit further generates a second periodic voltage signal between the second terminal and the earth ground, wherein at least an amplitude of each of the first periodic voltage signal and the second periodic voltage signal is controlled to essentially offset the common mode (CM) current flowing through the first parasitic capacitor and the second parasitic capacitor.

7. The circuit of claim 6, wherein the first periodic voltage signal consists of a first period of time and a second period of time, wherein during the first period of time a voltage level of the first periodic voltage signal is substantially positive, and during the second time period a voltage level of the first periodic voltage signal is substantially negative; wherein the second periodic voltage signal consists of a first period of time and a second period of time, wherein during the first period of time a voltage level of the second periodic voltage signal is substantially negative, and during the second time period the voltage level of the second periodic voltage signal is substantially positive.

8. The circuit of claim 7, wherein each of the first and second time periods of the first periodic voltage signal substantially matches each of the first and second time periods of the second periodic voltage signal respectively.

9. The circuit of claim 8, wherein parasitic capacitances in a vicinity of the first and second transmitter electrodes are different, wherein the vicinity of the first transmitter electrode and the second transmitter electrode includes at least a surface to which the first transmitter electrode and second transmitter electrode are mechanically connected.

10. The circuit of claim 6, wherein the circuit is further configured to change a width of each of the first periodic voltage signal and the second periodic voltage signal until the CM current flowing through the first parasitic capacitor and the second parasitic capacitor is essentially offset.

11. The circuit of claim 10, further comprising:
- a switching bridge including a first pair of switches and a second pair of switches;
- wherein the first pair of switches includes two switches, a switch is connected to the first transmitter electrode and a first terminal of a power supply generator and a second switch is connected to the second transmitter electrode and a second terminal of the power supply generator;
- wherein the second pair of switches includes two switches, a switch is connected to the first transmitter electrode and the second terminal of the power supply generator and a switch is connected to the second transmitter electrode and to the second terminal of the power supply generator, the second terminal of the power supply generator is connected to the protected earth for connection to the earth ground; and
- wherein switching of each of the first pair of switches and the second pair of switches is controlled to essentially offset the CM current flowing through the first parasitic capacitor and the second parasitic capacitor.

12. The circuit of claim 11, wherein the switching of each of the first pair of switches and the second pair of switches is controlled to change amplitudes of currents flowing through the first parasitic capacitor and the second parasitic capacitor until the amplitudes of the currents essentially cancel each other.

13. The circuit of claim 11, wherein the switching of the first pair of switches is controlled to change a width of a voltage pulse between the second transmitter electrode and the earth ground, wherein the switching of the second pair of switches is controlled to change a width of a voltage pulse between the first transmitter electrode and the earth ground.

14. The circuit of claim 11, wherein the first pair of switches and the second pair of switches are controlled in an asymmetric operation, wherein the asymmetric operation comprises a different duty cycle for control of the switches of the first pair of switches and control of the switches of the second pair of switches.

15. The circuit of claim 6, wherein the CM current is a sum of a first parasitic current and a second parasitic current.

* * * * *